United States Patent [19]
Wilson et al.

[11] Patent Number: 5,278,702
[45] Date of Patent: Jan. 11, 1994

[54] DATA SYNCHRONIZER WITH SYMMETRIC WINDOW GENERATION

[75] Inventors: Ronald E. Wilson, Lake Forest; Karl M. J. Lofgren, Newport Beach, both of Calif.

[73] Assignee: Western Digital Corporation, Irvine, Calif.

[21] Appl. No.: 685,473

[22] Filed: Apr. 12, 1991

[51] Int. Cl.$^5$ .............................................. G11B 5/09
[52] U.S. Cl. ........................................ 360/51; 360/46; 375/120
[58] Field of Search .......................... 360/51, 46, 67; 375/120; 329/325; 307/527, 265, 272.3

[56] References Cited

U.S. PATENT DOCUMENTS

| | | | |
|---|---|---|---|
| 4,580,100 | 4/1986 | Suzuki et al. | 360/51 |
| 4,726,022 | 2/1988 | Chan et al. | 360/51 |
| 4,933,959 | 6/1990 | Knechtel | 375/120 |
| 5,097,489 | 3/1992 | Tucci | 375/120 |
| 5,123,030 | 6/1992 | Kazawa et al. | 375/120 |

OTHER PUBLICATIONS

Western Digital Corporation Product Specification; WD10C22B; Self-Adjusting Data Separator, published 1988.
Western Digital Corporation Product Specification; WD10C20-05; Self-Adjusting Data Separator.
Western Digital Corporation Product Specification; WD10C21A; Self-Adjusting Data Separator, published 1988.
Western Digital Corporation Product Specification; WD10C20B; Self-Adjusting Data Separator, published 1987.

*Primary Examiner*—Robert J. Pascal
*Assistant Examiner*—Tan Dinh
*Attorney, Agent, or Firm*—Christie, Parker & Hale

[57] ABSTRACT

A phase-locked system for recovering data from a disk drive includes a phase detector for signalling the difference in phase between incoming delayed data pulses and a phase detection window clock signal. The phase detection window clock signal is derived from one output of an integrated-circuit window generator, driven by the output of a voltage-controlled oscillator whose frequency is controlled by the phase detector. The phase-locked loop is completed by comparing the phase detection window clock signal output of the window generator with the incoming delayed data pulses in the phase detector. Data detection window clock pulses, defining time windows in which the delayed data pulses are exactly centered, are produced at a second output of the window generator which has a line about which it is essentially symmetric, resulting in the two outputs of the window generator being exactly 180° apart in phase from each other.

15 Claims, 8 Drawing Sheets

DATA SYNCHRONIZER WITH SYMMETRIC WINDOW GENERATION

FIELD OF THE INVENTION

This invention is directed to disk drive data recovery systems and, more particularly, to a system for and a method of synchronizing an asynchronous data stream being read from a disk drive.

BACKGROUND OF THE INVENTION

In electromechanical data storage devices such as a disk drive, data being stored is normally recorded onto a magnetic disk in an encoded form consisting of an irregular pattern of ones and zeros. Binary data being recorded is typically synchronous, in that the sequence of ONES and ZEROS making up the data stream occurs with reference to a data bit cell, defined by a uniform or single-frequency clock signal. Recording the clock signal, together with the data, would take up valuable storage room and reduce the data storage capacity of the disk. Using self clocking techniques well known in the art, synchronous binary data is encoded into patterns of ONES and ZEROS, in accord with specific rules regarding the number of consecutive binary ZEROS allowed before a binary ONE signal is required.

Even though some degree of self clocking is inherent in the encoded data, some method of evaluating the encoded data stream must be used in order that a data recovery system may determine how many ZEROS occur consecutively between ONES. In a typical disk drive data recovery system, this function is performed by a data synchronizer which regenerates a synchronous timing reference signal from the encoded data and synchronizes the encoded data stream to that reference. In effect, the data synchronizer generates a synchronous stream of successive windows in time, each window representing a bit cell (in this case, a code bit cell), with which one or more encoded data bit(s) is/are associated. A time period of no ONES may then be referenced to the windows (bit cells) and the number of consecutive ZEROS extracted. For example, six consecutive windows occurring between encoded ONES means there are six consecutive ZEROS in the code. However, the frequency of a recovered synchronization clock synthesized by the data synchronizer is subject to a number of variations introduced by the electronic and mechanical components of the disk drive system. Mechanical system irregularities, such as motor speed variation, spindle bearing noise, actuator flexure, head resonances, and disk platter eccentricity, typically introduce a low-frequency component to the encoded data stream, resulting in a slowly varying read-channel-data rate, while electronic components in the data path typically introduce elements of phase, frequency and write splice noise which are high frequency in nature and more random in their effect on any particular code bit. This last phenomenon is known in the art as "bit jitter". A data synchronizer must take these variations in encoded data frequency into account when synchronizing the data stream.

Common implementations of a data synchronizer include a phase-locked loop (PLL), normally comprising a phase comparator, charge pump, filter, and a means for generating a synchronous feedback (clock) signal, such as a voltage controlled oscillator (VCO). At the beginning of a data read operation, during what is termed velocity lock, the oscillation frequency of the VCO is determined by, and locked to the frequency of, a pulse train recorded in a synchronization field, provided on the data track for such purpose, and occurring just prior in time to the encoded data stream. Once frequency lock is established, the VCO runs in what might be termed a quasi-flywheel mode at a mean frequency determined during velocity lock. Subsequent correction control of the VCO frequency is developed by phase-locking a transition edge of the synchronous VCO signal to a transition edge of an incoming encoded data pulse. The VCO is phase-locked to the incoming encoded data stream by comparing, in the phase comparator, the phase of the rising edge of a data ONE bit to the rising edge of the VCO clock signal. A phase (time) difference between the two rising edges will cause the charge pump to generate a control signal, directing the VCO to either speed up or slow down in response to a frequency variation in the encoded data stream. However, variations due to bit jitter are random in direction as well as frequency. Speeding up the VCO in response to an early-jittered data bit may result in over-correction, especially if the next data bit is jittered late.

A low pass filter is typically provided between the charge pump and the VCO to reject corrections resulting from random high-frequency variations of individual data bits due to bit jitter, and allow ideally only corrections resulting from consistent frequency shifts of the data stream, such as the slowly time-varying perturbations introduced by the mechanical systems discussed earlier. The VCO is therefore locked to the mean phase of the encoded data, rather than to the phase of a particular data bit. Once phase-locked, the synchronous VCO signal provides a recovered clock whose rate (frequency) is equal to the rate at which ONES and ZEROS occur, or an integral multiple thereof. Given perfect frequency and phase-lock of the VCO clock signal to the encoded data stream, the VCO clock might well be used as an analog to the original synchronous clock accompanying the original write data, serving to mark the boundaries of the encoded data bit cells (code bit cells). Perfect phase-lock of VCO to data, however, is not possible due in part to the rejection, within the low pass filter, of VCO phase correction signals resulting from the effects of bit jitter.

Figure 1:
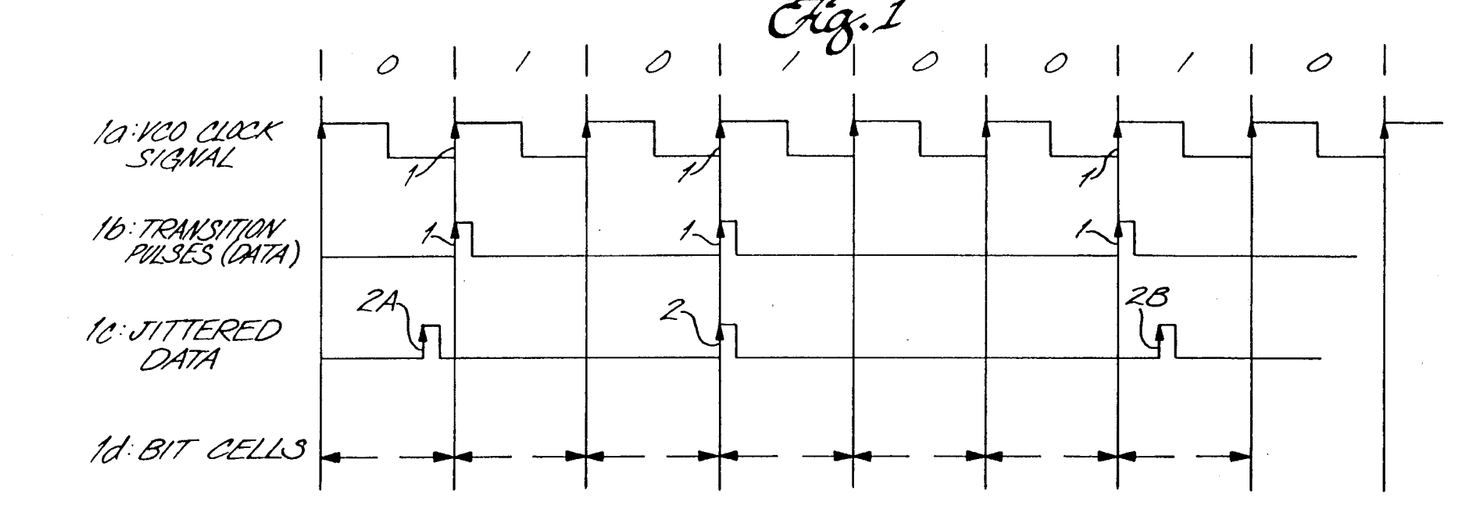
FIGS. 1a-1d are a series of waveforms illustrating the effects of bit jitter on an encoded data stream.

The term "bit jitter" refers to the fluctuations in pulse timing which result from a variety of factors, including magnetic surface flatness variations, nonuniformity of the magnetic properties of the media, uncompensated second order peak shift effects, imperfect peak shift precompensation, media deep magnetization, adjacent track pattern interference, incomplete erasure of previous recordings, and magnetic and electrical component noise; displacement of a pulse due to bit jitter being mostly random in both magnitude and direction. The effects of bit jitter on an encoded data stream are illustrated in FIG. 1. Encoded data pulses (FIG. 1b) have been phase-locked to the VCO clock (FIG. 1a), wherein rising edges of the VCO clock and rising edges of the encoded data coincide. Given perfect phase-lock, the rising edges of VCO clock might serve to define synchronous code bit cells (FIG. 1d); a data pulse edge (for instance, a rising edge) occurring within a code bit cell representing a logic ONE, no data edge occurring within a code bit cell representing a logic ZERO. The pulse sequence, illustrated in FIG. 1b, would therefore be read as 0101001. Since phase-lock occurs with respect to rising edges 1, an early jittered encoded data pulse rising edge will necessarily occur before the rising edge of the VCO clock signal defining the beginning of the data pulse's respective code bit cell Referring to FIG. 1c, bit jitter has displaced one pulse (2a) early, one pulse (2b) late, and one pulse (2) not at all. The early jittered pulse 2a falls outside of its respective code bit cell, into the previous cell, causing the data stream pulse sequence to be incorrectly read as 1001001 rather than 0101001.

Figure 2:
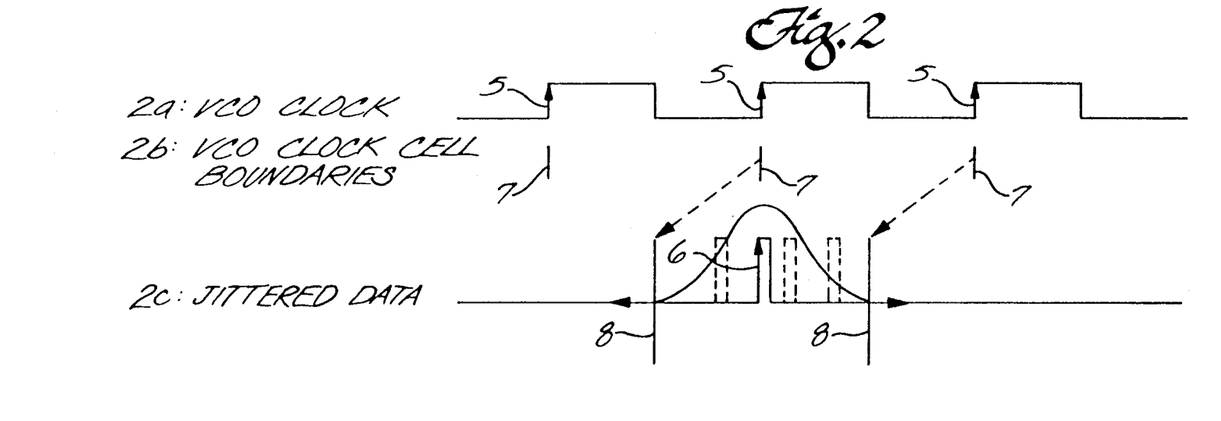
FIGS. 2a-2c illustrate the random nature of bit jitter.

The random nature of bit jitter can be appreciated by referring to FIG. 2. Shifts in the nominal position of a data bit due to timing fluctuations (bit jitter) result in a normal distribution of possible transition pulse rising edge positions, distributed, with respect to time, around the occurrence of the VCO clock rising edge 5 with which the nominal phase of the transition pulse rising edge 6 is locked by means of the phase comparator. This phenomenon is described in detail in U.S. Pat. No. 4,809,088, issued on Feb. 28, 1989, and assigned to the same assignee as the present invention. It will be apparent, from inspection of FIG. 2, that, were the VCO clock signal rising edges 5 used to define the code bit cell boundaries 7, there would be approximately a 50% probability that a transition pulse, having rising edge 6, would be jittered early and therefore not captured in the proper code bit cell, giving rise to a read data error. A code bit cell should properly have its boundaries equidistant from, or symmetric about, the mean of a symmetric distribution of transition pulse positions 8, rather than the other way around. Since the triggering edges of the VCO clock signal provide the necessary phase reference to the nominal phase position of a transition pulse in the phase detector, some other means must be provided to capture a transition pulse within a bit cell boundary without regard to its displacement due to jitter.

A data synchronizer must establish what is termed a data detection window or, simply, a "window" around the expected position of a transition pulse. Windows are generated end-to-end in time by the data synchronizer at a repetition rate equal to the VCO clock frequency and, therefore, the channel rate of the data. An ideal window may be looked at as an allotment of time within which a transition edge, if it occurs, will be interpreted as occurring exactly in the window center, thus allowing for random displacement of individual transition pulses due to bit jitter, with no effect on the accuracy of the data recovery error rate. Because of the bell shaped position probability distribution associated with displacements due to bit jitter, it can be seen that for optimum performance, the window must be accurately centered about the mean of this distribution.

The most common prior art data synchronizers employ a phase-locked loop comprising a phase comparator, charge pump, low pass filter and VCO as described previously. The phase comparator receives the data at one input and the VCO output clock on another input for phase comparison. Additionally, the VCO output clock is inverted by an inverter element, and the inverted clock is applied to a data detector as a data detection window. Inversion has the effect of delaying the VCO output clock by one half of its period and thus causing the triggering edges of the inverted clock signal to be substantially symmetric about the position distribution of transition pulses which are then centered within respective data detection windows.

Figure 3:
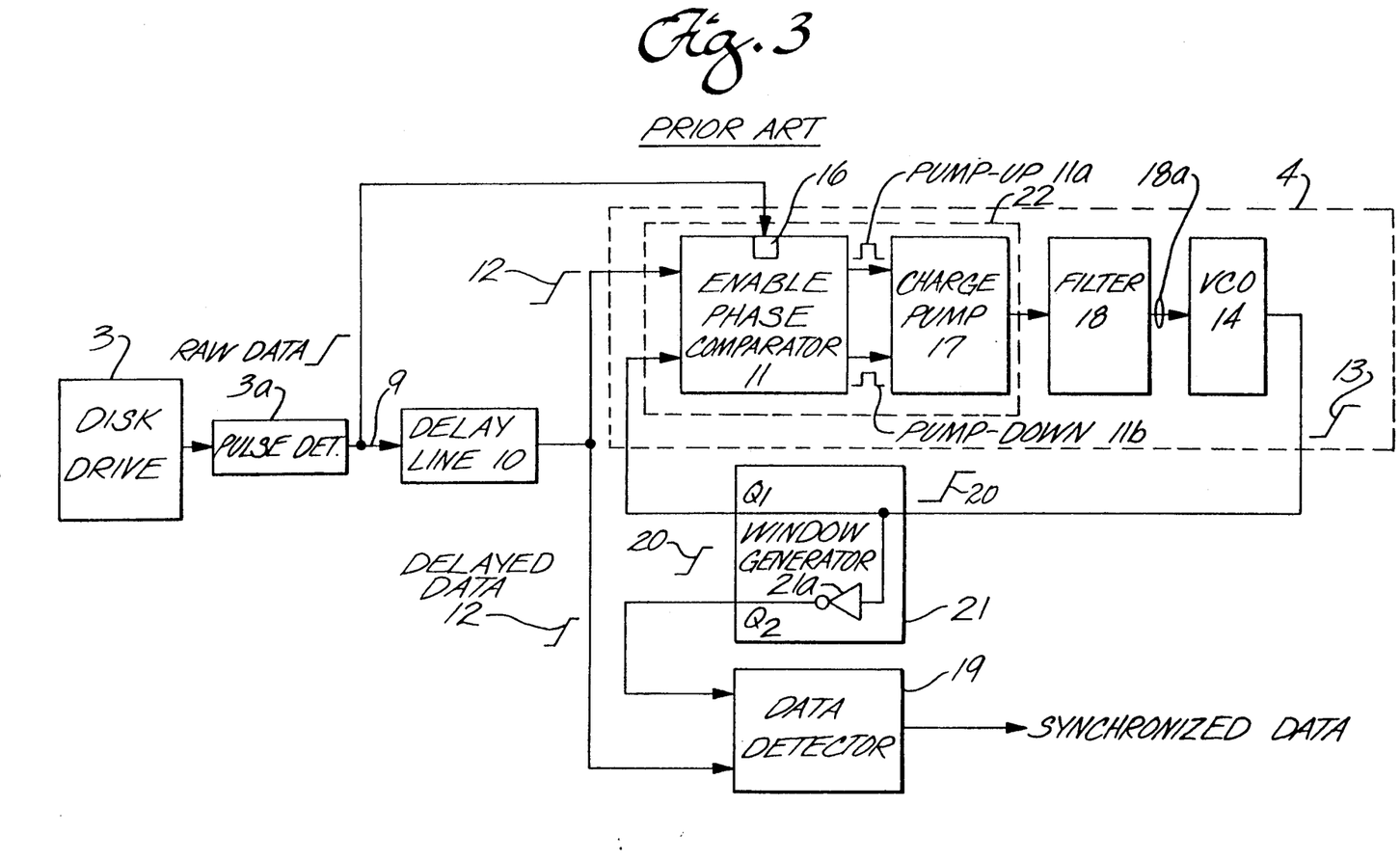
FIG. 3 is a block diagram of a conventional disk drive data synchronizer.

A typical prior art data synchronizer is illustrated in FIG. 3. Connected to receive pulses from a disk drive 3 and pulse detector 3a, it comprises a delay line 10, a data detector 19, a window generator 21, and a phase-locked loop 4 formed of a phase comparator 11, charge pump 17, filter 18, and VCO 14.

As read data is recovered from the disk drive 3, transition pulses 9, representing pulse-formed raw data, are developed in the pulse detector 3a in the drive read channel. The raw data transition pulses are delayed in time by the delay line 10, and the resulting delayed data pulse 12 is directed over a line 15 to an input of the phase comparator 11. The output of the VCO 14 (hereinafter phase detection window clock 13) is applied to the phase comparator where its phase is referenced (compared) to the phase of the input signal (delayed data pulse 12). The phase comparator 11 produces two outputs, pump-up pulse 11a and pump-down pulse 11b. Pump-up pulse 11a is produced if the delayed data pulse 12 leads the phase detection window clock 13, and pump-down pulse 11b is produced if the delayed data pulse 12 lags the phase detection window clock 13. The width of the pulses 11a, 11b reflects the extent of the lead or lag respectively. The outputs 11a, 11b are applied to the charge pump 17, which is operative to apply a source or sink current to the filter 18, depending on whether it receives pulse 11a or 11b. The combination of phase comparator and charge pump is sometimes referred to as a "phase detector" 22 and shall, when appropriate be so referred to herein. In response to the phase detector signal, the filter 18 applies a jitter-free, low-frequency control signal 18a to the VCO 14. The unfiltered control signal's sign depends on whether the delayed data pulse 12 leads or lags, and its magnitude is a function of the extent of the lead or lag. Thus, the output frequency of the VCO 14 is increased or reduced, as appropriate, to reduce the lead or lag at the inputs of the phase comparator 11. The phase-locked loop 4 thus insures that the VCO output, used as the phase detection window clock 13, is locked in phase with the incoming data.

The phase detection window clock 13 is a regular and periodic signal, whereas the occurrence of a data bit is irregular. Attempting to compare the phase of a phase detection window clock 13 to a data ZERO, i.e., when there is no transition pulse edge, would lead to runaway correction, unless the phase comparator 11 was disabled during those times a transition pulse 9 was not present. For this reason, the raw data 9 is directed as a phase error detector enable signal to the enable input 16 of the phase comparator 11. This insures that the phase comparator 11 is enabled just prior to the arrival of a delayed data pulse 12 whose phase is to be compared to that of the phase detection window clock 13.

Data detection occurs in a data detector 19, which functions to determine whether a delayed data pulse 12 occurs within a respective data detection window. The delayed data pulse 12, which is being phase compared to the phase detection window clock 13, is also directed to the input of the data detector 19. The data detector 19 may include a D flip-flop with its D input tied to ground. A data detection window clock 20 is derived from the VCO's phase detection window clock 13 by inverting that signal through an inverting means 21 provided in the window generator 21. Inversion of the phase detection window clock 13 seeks to construct a data detection window clock 20 having the same period as the phase detection window clock 13, and having a 180° phase relationship therewith, such that successive triggering edges of the data detection window clock 20 bracket successive triggering edges of the phase detection window clock 13. Since triggering edges of the phase detection window clock 13 are phase-locked with the delayed data pulses 12, the triggering edges of the data detection window clock 20 will therefore bracket the delayed data pulses 12 as well. The object of this data detection window clock 20 is to provide a synchronous stream of time windows, within which the distribution of positions of delayed data pulses 12 (when they occur) is centered, such that bit jitter merely displaces a pulse within the window. If a delayed data pulse 12 occurs within a particular data detection window, the data detection window clock 20 provides the additional function of clocking the D flip-flop within the data detector 19 such that a data pulse, so detected, is synchronously latched into the D flip-flop by action of the data detection window clock 20 and is available on the output of the data detector 19 as a stable, synchronized data signal, having a fixed relationship with the data detection window clock 20, and having the position variations due to bit jitter removed.

The main shortcoming of prior art data synchronizers relying on inverter elements to derive a data detection window clock 20 from the phase detection window clock 13 is that the inherent internal delay of an inverter element precludes the data detection window clock 20 from being exactly 180° out-of-phase with the phase detection window clock 13, and therefore from exactly symmetrically bracketing the distribution of delayed data pulses 12. Power supply voltage fluctuations, temperature variations and manufacturing parameter drift combine to distort the symmetry of an inverter's output characteristic, making it a less-than-ideal phase shifter. This lack of symmetry has significant implications for high-speed, low-error-rate data recovery systems.

Error rate is defined as the number of data bits read before a detection error is encountered. For example, a $10^{-10}$ error rate means that one detection error will occur, on average, for every $10^{10}$ data bits recovered from the disk drive. In practice, lack of perfect symmetry between the data detection window clock 20 and the phase detection window clock 13 selectively shifts the boundaries of the detection window relative to the center of the data pulse position distribution. Any offset from center, in the detection window boundaries, will allow a portion of a tail of the data pulse position distribution to fall outside the detection window, in the direction away from the window offset, increasing the error rate, i.e., a detection window which is offset late by inherent delay, will not detect a data pulse positioned very early in the distribution. Error rate increases to the extent data pulses drift beyond the window boundaries.

An additional drawback to prior art data synchronizers relates to their utility in disk drive systems making use of Zoned Recording techniques. Zoned Recording (ZR) relates to the arbitrary division of a disk surface into a series of concentric zones, into which data is recorded at progressively greater frequencies as the zones into which data is recorded are located progressively radially outward. In pre-ZR disk drive systems, the recording frequency of digital data was determined by the maximum bit density which could be accommodated by the most inward track on the magnetic data disk. Once established, this frequency remained invariant, even though the same bit density could be accommodated on more radially outward tracks, regardless of their progressively increasing length. This inefficient recording method was addressed by ZR, which allows variation of the recording frequency depending on the zone in which the track to be recorded lies, thereby increasing recording bit densities and yielding more efficient use of the disk storage surface.

As a consequence of variable frequency recording (ZR), a data detection window provided by the data synchronizer must be able to accommodate variations in its own frequency in order to provide for accurate detection and capture of data running at a variable channel rate. Inverters introduce invariant delay elements to waveforms which they invert. For instance, if an inverter delays a clock signal running at some frequency, it will delay a clock signal running at twice that frequency by the same amount x. But, increasing the clock frequency is the same thing as reducing its period, or, in other words, shortening the window. If a window is shortened, but shifted the same amount as an unshortened window by the invariant delay, the percentage phase error introduced by the inverter is increased in a manner directly proportional to the increase in clock frequency. Inverter elements, therefore, do not provide an exact and constant 180° phase relationship between the input signal and the output signal, independent of frequency variations, and the phase relationship that is obtained is subject to variation proportional to the input signal frequency.

SUMMARY OF THE INVENTION

One object of the present invention is to provide a disk drive data synchronizer in which the distribution of possible bit-jittered positions of a data pulse is precisely centered within a data detection window.

Another object of the present invention is to provide a data synchronizer incorporating a phase-locked loop wherein the phase detection window clock and the data detection window clock are derived from a common source and have an exact 180° phase relationship that is not subject to variation in the input clock signal frequency, or to process, temperature, or voltage variation.

A further object of the present invention is to derive a phase detection window clock and a data detection window clock from a common, symmetrically alternating input clock signal, through opposite $\phi 1$ and $\phi 2$ outputs of a frequency divider which is characterized by an exactly symmetric arrangement of its component elements about a centerline, on either side of which are located the elements associated with the generation of the phase detection window clock and the data detection window clock signals respectively. By maintaining such symmetry, both output clock signals will be burdened with identical delay components, such that their phase relationship is maintained at 180° regardless of variations in operating temperature, supply voltage, manufacturing parameter variations, or the like.

These and other objects are attained in accordance with the invention by a disk drive data synchronizer which derives from an irregular series of data pulses in a pulse train (such as delayed data pulses 12) window clock signals designating successive time periods (T), each window clock signal being dedicated to the discerning of the presence or absence of a respective one of the data pulses during a respective one of the time periods and to the synchronization of a discerned one of those data pulses. The synchronizer comprises four principal elements: variable frequency means, a symmetric window generator, phase detector means, and data detector means. The variable frequency means generates a first periodic (VCO) clock signal whose nominal frequency is an integral multiple of the frequency of the pulse train and whose frequency is variable in response to a frequency control signal. The symmetric window generator is driven by the first clock signal and generates second and third periodic clock signals (phase detection window clock and data detection window clock) in response to, and at an integral submultiple of the frequency of, the first clock signal. The second and third clock signals are phased exactly 180° apart. The phase detector means produces a phase detector signal representative of the sign and magnitude of the phase difference between the second clock signal and the data pulses. Provided with the phase detector means are means for applying the average of the phase detector signal to the variable frequency means as its frequency control signal. Finally, the data detector means is responsive to the third clock signal and to the data pulses for discerning the presence or absence of a data pulse during each of the time periods (T) and synchronizing the discerned data pulse with respect to the third clock signal.

In further keeping with the invention, the window generator comprises an integrated circuit having a line of symmetry separating substantially identical halves of the integrated circuit, each half having an output on which is carried a respective one of the second and third clock signals. More specifically, each half of the window generator comprises a respective one of a pair of cross-connected logic gates and a feedback loop connected between the output of the cross-connected logic gates and its input. In accordance with this aspect of the invention, the integrated circuit is a frequency divider having first and second mutually exclusive states, and each feedback loop includes means for conditionally enabling it during portions of the times during which respective ones of those states prevail.

DETAILED DESCRIPTION

Figure 4:
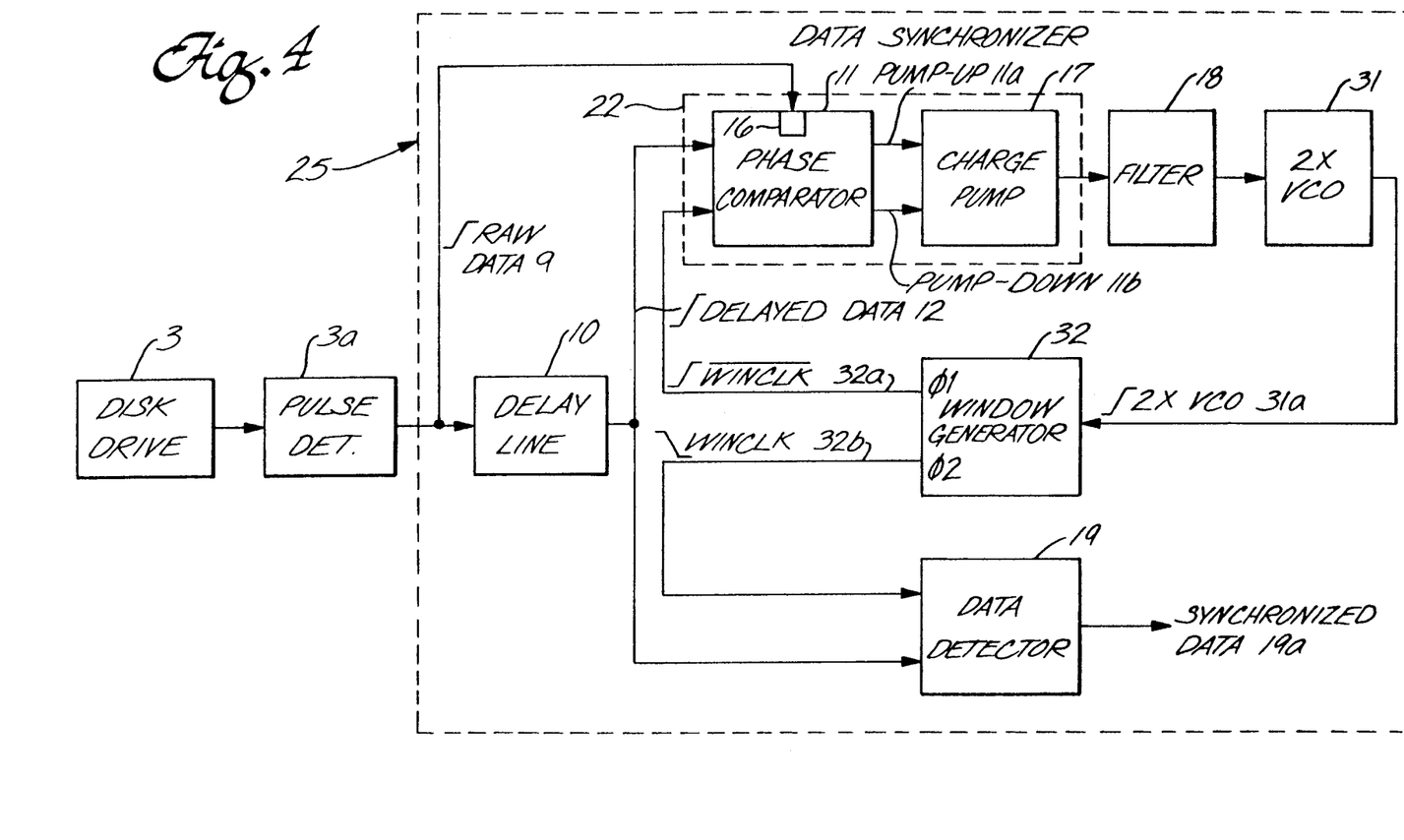
FIG. 4 is a block diagram of the improved disk drive data synchronizer of the present invention.

Referring to FIG. 4, there is disclosed a data synchronizer 100 constructed in accordance with the present invention. It is seen to be similar to the conventional data synchronizer described with reference to FIG. 3, but with two significant differences. First, the window generator 21 of FIG. 3 has been replaced with the improved window generator 32 of the present invention, and second, the VCO 14 of FIG. 3 has been replaced by a 2x VCO 31, in recognition of the fact that the window generator 32 is essentially a divide-by-two circuit. Since it is desired that the clock signals produced by the window generator have the same nominal frequency as that of the raw data pulses 9 (i.e., the channel rate), it is necessary to provide clock pulses to the window generator 32 at twice the channel rate. It will be understood that the frequency of the 2x VCO 31 may be any integral multiple of the inputs to the phase comparator 11 so long as the input clock 31a to the window generator 32 is twice the channel rate.

In a manner similar to that described with reference to FIG. 3, raw data pulses 9, derived from a disk drive 3 by means of a pulse detector 3a, are applied to the enable input 16 of the phase comparator 11 and to the input of the delay line 10. The output of delay line 10, delayed data 12, is applied to one input of the phase comparator 11 and to one input of the data detector 19. The other input of the phase comparator 11 receives the output (hereinafter referred to as $\overline{\text{WINCLK}}$ 32a), appearing on the φ1 output of the window generator 32. As will be explained in greater detail, the window generator 32 has two outputs, φ1 and φ2, on which appear two complementary signals (exactly 180° apart), respectively labeled $\overline{\text{WINCLK}}$ 32a and WINCLK 32b. The WINCLK 32b is applied to the other input of the data detector 19. Respectively, $\overline{\text{WINCLK}}$ 32a and WINCLK 32b are the phase reference window clock signal and the data reference window clock signal previously mentioned in connection with the data synchronizer of FIG. 3.

Figure 5:
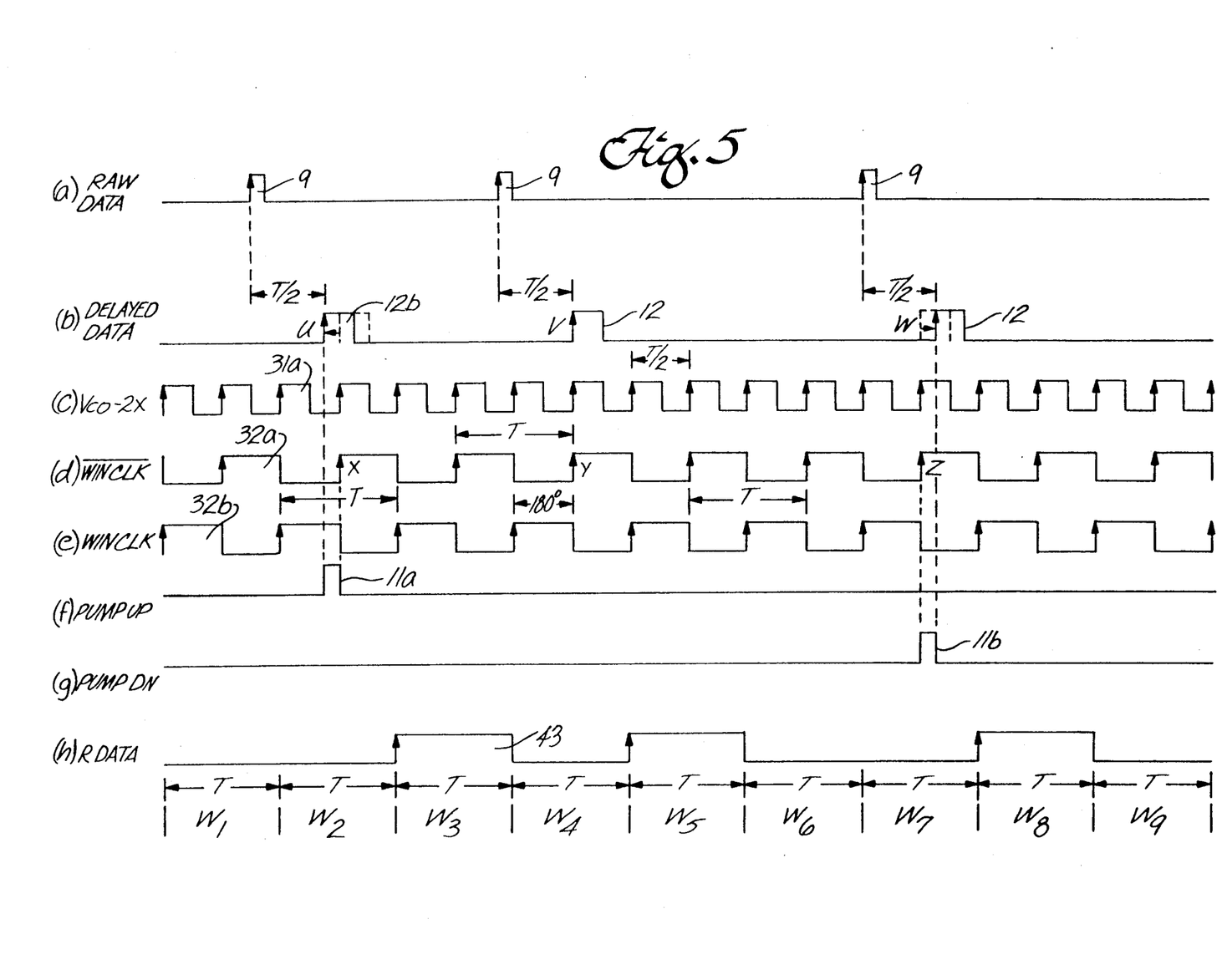
FIGS. 5a-5h are a series of waveforms illustrating the operation of the improved data synchronizer of FIG. 4.

The nature of the signals which appear in the circuit 100 of FIG. 4 may be best understood with reference to FIG. 5. Each of a succession of raw data pulses 9 causes a delayed data pulse 12 to appear at the output of the delay line 10, delayed with reference to the trailing edge of the pulse 9 by a period T/2, which is seen from FIG. 5c to be the nominal period of the 2x VCO output 31a. The nominal frequency of the 2x VCO 31 is twice the channel rate of the raw data 9. The phase comparator 11 produces either a pump-up signal 11a or a pump-down signal 11b, depending upon the relative phases of the delayed data 12 and $\overline{\text{WINCLK}}$ 32a. If the rising edge of the delayed data 12 leads the rising edge of $\overline{\text{WINCLK}}$ 32a, as shown by the rising edge U of the first delayed data pulse 12 in FIG. 5b and the nearest rising edge X of $\overline{\text{WINCLK}}$ 32a in FIG. 5d, a pump-up signal 11a is generated. The leading and trailing edges of the pump-up signal 11a are seen to coincide with the rising edges U and X of the delayed data pulse 12 and $\overline{\text{WINCLK}}$ 32a, respectively, so that the width of the pump-up signal 11a is proportional to the phase difference between them. A similar relationship may be observed by comparing the third illustrated delayed data pulse 12 in FIG. 5b and the nearest $\overline{\text{WINCLK}}$ 32a rising edge Z. In this case, the delayed data pulse 12 is retarded so that its leading edge W trails the leading edge Z of $\overline{\text{WINCLK}}$ 32a, resulting in a pump-down signal 11b whose width represents the extent of the phase difference between the rising edges W and Z. By means of the charge pump 17 and the filter 18, the frequency of the 2x VCO 31 is adjusted so that, when divided down by two in the window generator 32, the phase reference window clock, $\overline{\text{WINCLK}}$ 32a, will shift in phase until it is phase locked to the delayed data pulse 12. The latter condition is illustrated by the second delayed data pulse 12, shown in FIG. 5b, whose rising edge V is seen to coincide with the nearest-in-time rising edge Y of $\overline{\text{WINCLK}}$ 32a. When this condition prevails, no pump-up or pump-down signal is produced by the phase comparator 11. By virtue of the fact that the window generator 32 is operative to produce at its $\phi$2 output a signal WINCLK 32b, which is exactly 180° out-of-phase with the signal on its $\phi$1 output, the window generator 32 is operative to produce at its $\phi$2 output a signal whose successive rising edges define a series of data detection windows W1-WN, each having a time duration T, which windows are characterized by the fact that they bracket the position distribution of the delayed data pulses 12 so that they are centered within the respective data detection windows. This is best represented by the location of the second data pulse in FIG. 5b, whose rising edge V is seen to fall at the midpoint of its corresponding window W4.

The data detector 19 operates in the manner described previously with reference to the FIG. 3 data synchronizer. That is, it is operative to discern the presence during each of the windows W1-WN of a delayed data pulse 12 and to synchronize the discerned data pulse with respect to the data detection window clock, WINCLK 32b. Thus, FIG. 5h shows that each time there occurs a delayed data pulse 12 (FIG. 5b), there is produced at the output of the data detector 19 a synchronized data pulse 19a, whose rising edge coincides with that particular rising edge of WINCLK 32b which defines the beginning of the window immediately following the window during which the delayed data pulse 12 occurred. Thus, each delayed data pulse 12 is discerned by the data detector during a given one of a succession of data detection windows W1-WN and is synchronized with respect to the data detection window clock WINCLK 32b so as to produce a synchronized data pulse 19a during the immediately-following one of the data detection windows W1-WN.

Figure 6:
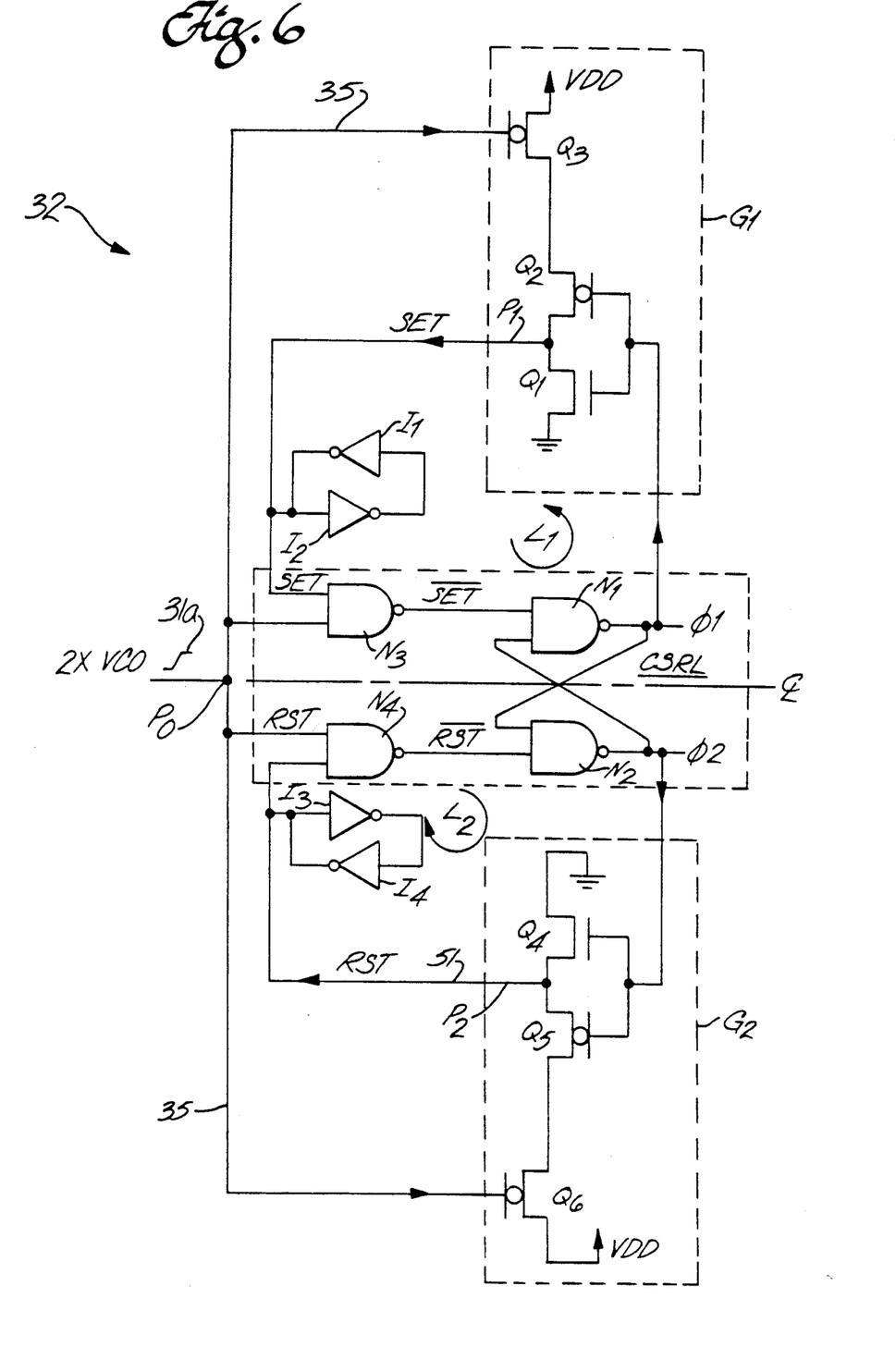
FIG. 6 is a circuit diagram of a divide-by-two circuit incorporating a feature of the present invention whereby clocked feedback loops are provided to prevent runaway oscillation.

FIG. 6 illustrates in greater detail a basic form of the window generator 32 depicted generally in FIG. 4. NAND gates N1-N4 are configured as a clocked set-reset latch (CSRL) where NAND gates N3 and N4 are two-input NANDs, each having one of its inputs connected to a common input clock signal, 2x VCO 31a, and whose outputs, denoted $\overline{\text{SET}}$ and $\overline{\text{RST}}$ respectively, are directed to the inputs of a cross-coupled pair of two-input NAND gates N1 and N2. The $\overline{\text{RST}}$ output of N4 provides one of N2's input signals, while the $\overline{\text{SET}}$ output of N3 provides one of N1's two inputs. The output of N2, the inverting or $\phi$2 output of the window generator 32, is also cross-coupled to the second input of N1, while the N1 output signal, the non-inverting or $\phi$1 output of the window generator 32, is cross-coupled to the second input of N2. A selectively switchable feedback network is connected to each of the respective outputs of NAND gates N1 and N2 and the respective second inputs of NAND gates N3 and N4, such that there is a selectively enabled feedback path L2 between the $\phi$2 output of NAND gate N2 and the RST input of NAND gate N4, and symmetrically, a selectively enabled feedback path L1 between the $\phi$1 output of NAND gate N1 and the SET input of NAND gate N3. The CSRL and its feedback loops L1 and L2 are disposed in such a manner that each feedback loop resides in its respective half of the circuit, and that the CSRL and its feedback loops, comprising the circuit, are symmetric about a common centerline of symmetry CL.

The first switchable feedback gate G1, in the feedback loop L1, comprises a pair of transistors, an n-channel Q1 and a p-channel Q2, connected in series, source-to-drain and with their gates connected jointly to the output of the circuit. Following common convention, an n-channel transistor is "on" when the potential applied to its gate is "high", while a p-channel transistor is deemed "on" when its gate potential is "low". The transistors Q1 and Q2, which function as an inverter, are connected between ground and a source of positive potential, typically the supply voltage VDD, through a p-channel switching transistor Q3, whose gate is connected to a 2x VCO input node P0 through control line 48. The output of the switchable gate G1 is taken from node P1, at the source-drain connection between transistors Q1 and Q2. Node P1 will be at ground potential when transistor Q1 is on, and either Q2 or Q3 is off, thus pulling the node low, and at the VDD potential when Q1 is off and transistors Q2 and Q3 are both on, thus pulling the node high. For reasons that will be explained subsequently, the switching transistor Q3 is provided to prevent node P1 from being pulled to VDD, by action of transistor Q2 alone, while the 2x VCO input signal 31a on the input node P0 is in a high state, whereas no similar transistor need be provided in series with Q1 to prevent P1 from being pulled to ground while 2x VCO signal 31a is high.

The second feedback loop L2 is similarly configured, with the switchable feedback gate G2 comprising an n-channel transistor Q4, and p-channel transistors Q5, and Q6, wherein the transistors Q4 and Q5 are connected in series source-to-drain between VDD and ground through the switching transistor Q6, whose gate is connected to 2x VCO input node P0 through the control line 48. As in the case of the switchable gate G1, the output of switchable gate G2 is taken from node P2, at the source-drain connection of transistors Q4 and Q5. P2 likewise swings between ground and VDD, depending respectively upon whether transistor Q4 is turned on, and Q5 off, by action of $\phi$2 going high, or Q4 is off and transistors Q5 and Q6 are on. Again, the switching transistor Q6 in gate G2 serves to prevent P2 from being pulled to VDD when 2x VCO signal 31a is high, but there is no corresponding transistor provided to prevent P2 from being pulled to ground during similar circumstances. As will be explained in detail in connection with FIG. 7, illustrating the operation of the circuit, the switchable gates G1 and G2 allow feedback of the $\phi$1 and $\phi$2 outputs to the SET and RST inputs of NAND gates N3 and N4, respectively, in such a manner that a change of state of the window generator is achieved once, and only once, for each like (in this case rising) edge of the 2x VCO input signal 31a.

Figure 7:
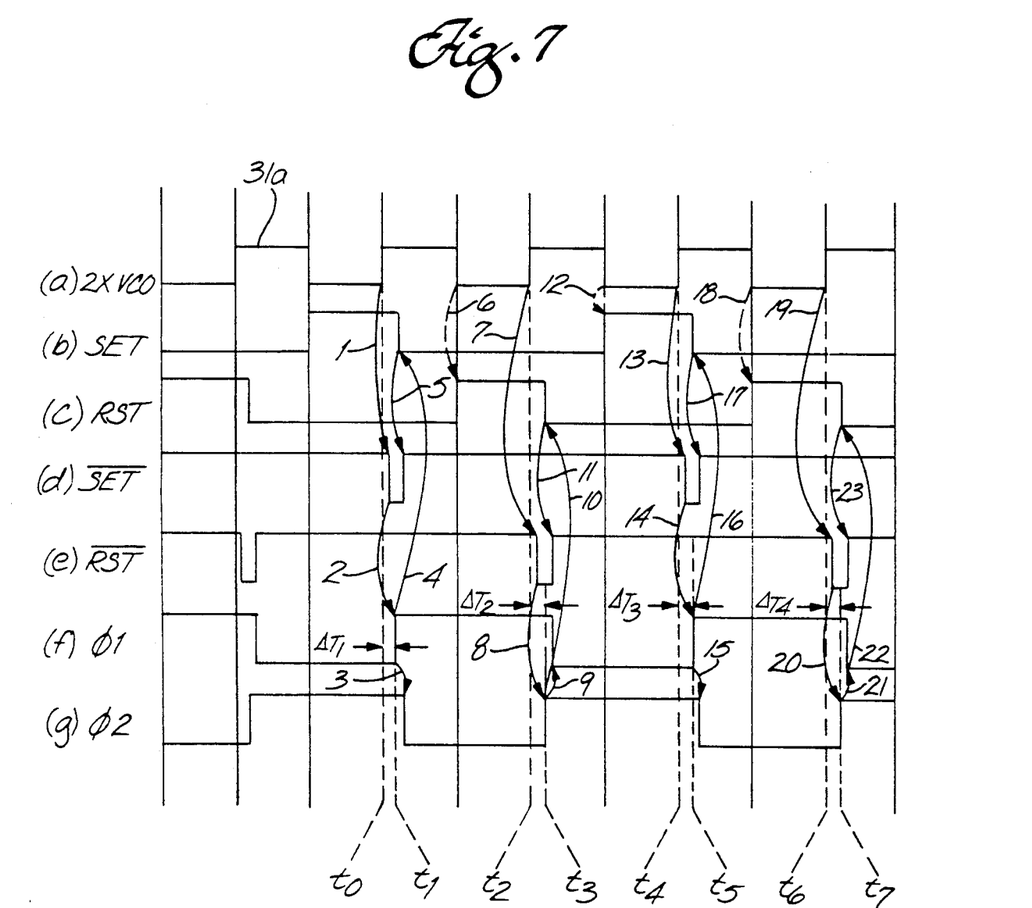
FIGS. 7a-7g are a series of waveforms of signals which appear at various points in the circuit of FIG. 6.

The window generator 32 of FIG. 6 may be best understood by following one-and-a-half complete cycles of its operation with reference to FIG. 7. The internal operating sequence will be described as a chain of events identified in FIG. 7 by arrows 1-22, each arrow leading to an event from the immediately preceding event which caused it. The sequence begins at time $t_0$ and ends at time $t_7$. For purposes of discussion, the initial state of the system is as follows: VCO, RST, and $\phi$1 are at 0, and SET, $\overline{\text{SET}}$, $\overline{\text{RST}}$, and $\phi$2 are at 1. VCO, SET, and RST refer to the signal levels prevailing at nodes P0, P1 and P2 respectively; $\overline{\text{SET}}$ and $\overline{\text{RST}}$ refer to the signals at the inputs of NAND gates N1 and N2 respectively; and φ1 and φ2 refer to the signal levels at the outputs of NAND gates N1 and N2 respectively. Also, when a point in the circuit is at 1, it is at a higher voltage than when it is at 0. Therefore, a point may be interchangeably described as "going to 1" or "going high", and, similarly, may be interchangeably referred to as "going to 0" or "going low", where it is understood that "going low" means going to ground potential, and that "going high" means going to VDD. The events are described in the following paragraphs, numbered to correspond to the sequence of events.

1. 2x VCO goes high and, since SET is high, two 1's are now input to NAND gate N3, causing the $\overline{SET}$ output to go to 0.

2. Since φ2 is initially at a 1, the combination of a 1 (φ2) and a 0 ($\overline{SET}$) on NAND gate N1 results in the φ1 output going to a 1.

3. With $\overline{RST}$ initially at a 1, the combination of a 1 (φ2) and a 1 ($\overline{RST}$) on NAND gate N2 results in the φ2 output going to a 0. The window generator is now in the set state, that is, φ1 and φ2 low. The φ2 output going to 0 turns off transistor Q4, turns on transistor Q5, but node P2 does not rise to VDD since transistor Q6 remains off due to its gate being held high by 2x VCO. The φ2 0 output is not, therefore, propagated to the RST input of NAND gate N4.

4. As φ1 goes to 1, transistor Q1 is turned on, pulling node P1 low and causing the SET input of NAND gate N3 to go to 0.

5. With 2x VCO at a 1, the combination of a 1 (2x VCO) and a 0 (SET) on NAND gate N3 causes $\overline{SET}$ to go to 1. The window generator is in a remember state, with φ1 and φ2 remaining at 1 and 0 respectively. The total delay time $Dt_1$ between the 2x VCO transition to a 1 and the φ1 output transition to a 1, is $t_1-t_0$, the sum of the delays incurred during steps 1 and 2.

6. 2x VCO now transitions to 0. Q6 is turned on and node P2 is now allowed to go high. RST, therefore, becomes a 1. However, since 2x VCO is at 0, $\overline{RST}$ remains unchanged at 1.

7. 2x VCO now transitions to 1. $\overline{RST}$, therefore goes to 0.

8. With $\overline{RST}$ now 0, the combination of a 0 ($\overline{RST}$) and a 1 (φ1) on NAND gate N2 causes the φ2 output to go to a 1.

9. The φ2 output, now at 1, is fed back to NAND gate N1, causing φ1 to go to a 0. Since φ1 and φ2 are at 0 and 1, respectively, the window generator is now in its reset state. Note that even though φ1 is at 0, the event is not propagated to node P1 and the SET input to NAND gate N3, because transistor Q3 is held in the off state by the high 2x VCO signal on its gate.

10. As φ2 goes to 1, transistor Q5 turns off, Q4 turns on and RST returns to 0.

11. The falling RST, NANDed at N4 with the high 2x VCO, causes $\overline{RST}$ to return to 1.

12. 2x VCO transitions to a 0, turns on transistor Q3 which now allows node P1 to go high. SET is therefore a 1. Because 2x VCO is 0, the $\overline{SET}$ output of NAND gate N3 remains a 1. The change, at node P1, from a 0 to a 1 has not propagated beyond the input of N3. The total delay time $8 t_2$ between the 2x VCO transition to a 1 and the φ2 output transition to a 1, is $t_3-t_2$, the sum of the delays incurred during steps 7 and 8.

13.-17. These sequences of events, triggered by 2x VCO transitioning to a 1 at time $t_4$ are precisely the same as those described in steps 1-5 respectively. The time delay $8 t_3$ is therefore identical to the time delay $8 t_1$.

18.-22. Similarly, these sequences of events, triggered by 2x VCO transitioning to a 1 at time $t_6$ are precisely the same as those described in steps 7-11 respectively. The time delay $8 t_4$ is therefore identical to the time delay $8 t_2$.

It may be observed, from inspection of FIG. 7, that the CSRL of FIG. 6 is switched between its SET and RESET states upon the occurrence of successive like triggering edges (in this case rising edges) of the input 2x VCO clock signal. A first series of alternate like 2x VCO edges, such as those shown as occurring at times $t_0$ and $t_4$, put the window generator into its SET state, and a second series of alternate like edges, such as those shown as occurring at times $t_2$ and $t_6$, i.e., alternating with the first series, put the window generator into its RESET state. The period of both φ1 and φ2 is therefore exactly twice that of the input signal (2x VCO signal 31a) and divide-by-two function is thereby accomplished. Since the period of 2x VCO signal 31a has been determined as being T/2, or one-half of the channel period T, it necessarily follows that the period of both φ1 and φ2 is equal to the channel period T.

Since 2x VCO 31a is a periodic waveform, such that the period (T/2) between each of its successive rising edges, such as those occurring at $t_0$, $t_2$, $t_4$, and $t_6$, is identical, it also follows that if the time delays associated with events triggered by the action of the first series of 2x VCO rising edges, such as $8 t_1$ and $8 t_3$, are equal to the time delays associated with events triggered by the second series of 2x VCO rising edges, such as $8 t_2$ and $8 t_4$, then successive like edges of the signal on φ2, such as those shown at times $t_3$ and $t_7$, will precisely bracket a corresponding successive like edge of the signal on φ1, such as that shown at time $t_5$.

Figure 9:
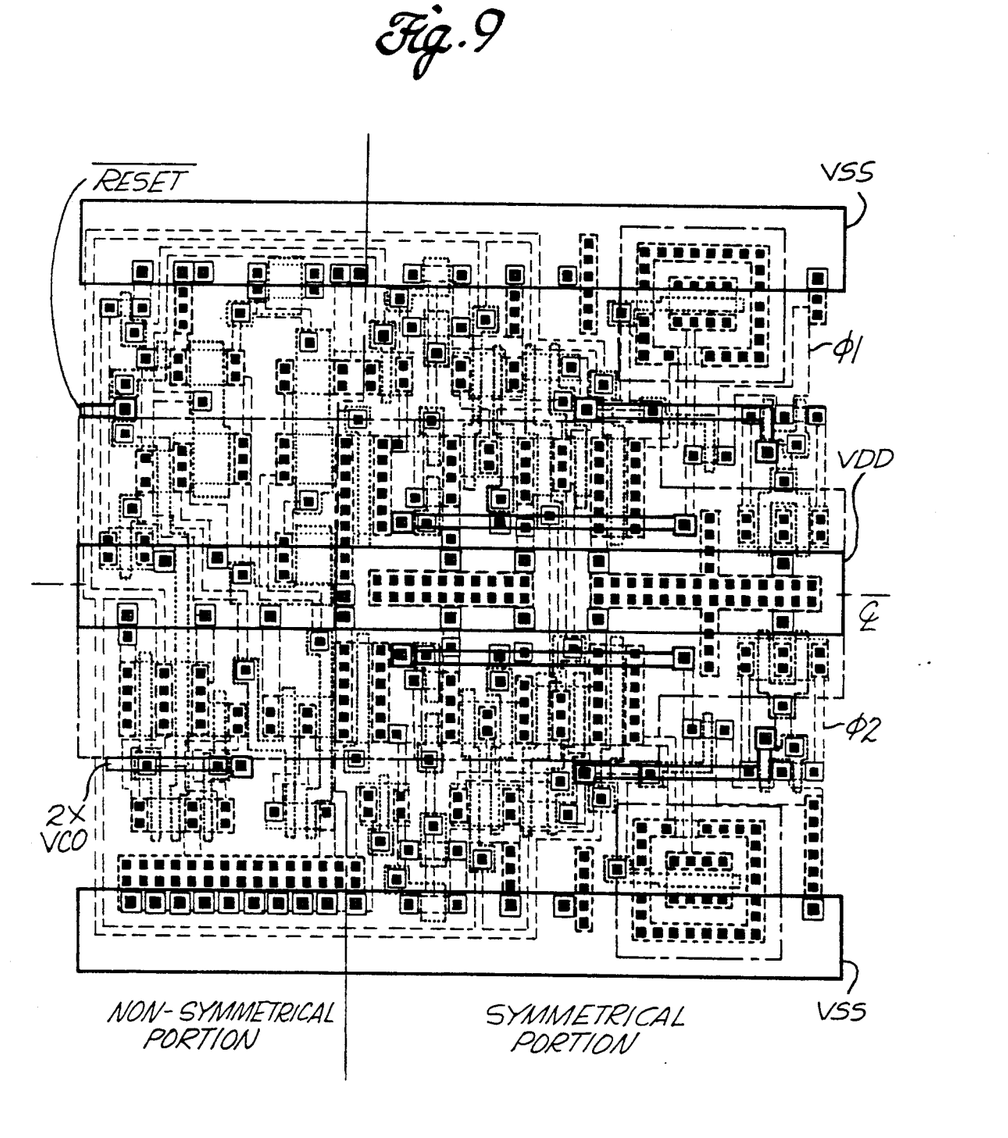
FIG. 9 is an integrated circuit layout of the circuit illustrated in FIG. 8, showing the symmetry of the circuit about its central axis.

The accuracy with which the rising edges of φ1 fall exactly midway between the rising edges of φ2 depends on the delays $8 t_1$ and $8 t_3$, associated with the φ1 (upper) half of the circuit, being identical to the corresponding delays $8 t_2$ and $8 t_4$, associated with the φ2 (lower) half of the circuit. To the extent the signal paths in the window generator's two halves can be made identical, the delays incurred in traversing those signal paths will be correspondingly identical. It is a singular feature of the present invention that, by virtue of the two halves of the window generator being identical in terms of component logic, they may be manufactured as mirror images of one another, each half being exactly symmetric about a central axis of symmetry with the other, by means of photolithographic layout techniques well known in the art. Each half thus mirrors the physical configuration of the other, and by operation of well known semiconductor principles, each half will therefore mirror the electrical characteristics of the other, including the signal path delay. This feature is illustrated in FIG. 9, where the integrated circuit layout of a window generator of the present invention is reproduced, showing its symmetry about a central axis. Any point in one half of the window generator illustrated in FIG. 9 is exactly mirrored by a corresponding point in the other half.

Two synchronous clock signals are therefore generated, so related that successive like edges of one precisely bracket successive like edges of the other. Stated differently, it may be said that the rising edges of φ1 are precisely 180° out-of-phase with the rising edges of φ2.

Selectively enabled feedback gates have been provided to each circuit half in order that the feedback path from an output to a corresponding input, i.e., from φ1 to the SET input of NAND gate N3, or from φ2 to the RST input of NAND gate N4, is disabled when the φ1 or φ2 output providing a signal to that particular feedback path goes to 0 while the 2x VCO 31a input at P0 is a 1. A feedback loop need not be disabled if the new output (φ1 or φ2), to which that feedback loop is connected, is transitioning to a 1. As illustration, assume φ2 is going to a 1 while 2x VCO is also at a 1. The 1 on φ2 is inverted twice, once at node P2 and once again through NAND gate N4, so that $\overline{RST}$ goes to a 1. Prior to the transition of φ2 from a 0 to 1, the φ1 output was a 1, which is inverted at P1, causing the SET input to N3 to be a 0, and $\overline{SET}$ to be a 1, because a 0 input to a NAND gate results in a 1 at its output, regardless of the state of its other input. With both $\overline{RST}$ and $\overline{SET}$ at 1, the window generator is placed in its remember state, and no further transitions occur. (The remember state of an SR latch is one in which it does not change states and is not being actively forced to a state, i.e., its state is determined by its cross-coupled feedback loop. It is placed in such a state when it receives two 1's on its inputs.)

In contrast to the conditions depicted in the preceding paragraph, if φ2 transitions to a 0, while 2x VCO is at a 1, the window generator would be put into internal oscillation without the provision of means that disable the respective feedback loop. Since the requirement is for disabling a feedback loop only when the 2x VCO signal 31a is a 1, the switching transistors Q3 and Q6 (and the feedback loops L1 and L2 of which they are a part) are only enabled (turned on) when 2x VCO is at 0. This assures that when Q2 or Q5 are turned on by action of φ1 or φ2 going low respectively, the nodes P1 or P2, respectively, are not pulled to VDD unless the 2x VCO is at 0.

It was noted earlier that the window generator 32 is put into its set state by a first series of alternate, like 2x VCO edges and is returned to its reset state by a second series of alternate, like 2x VCO edges which alternate with the alternate, like edges of the first series. Viewed in terms of clock cycles, the window generator 32 is put in its set state (φ1 high, φ2 low) during every other cycle of the 2x VCO clock signal 31a and, similarly, is put in its reset state during each intervening cycle, so that the 2x VCO cycles during which the window generator 32 is placed in its set state alternate with the cycles during which it is placed in its reset state.

It was just seen that a feedback loop needs to be disabled only during 2x VCO cycles when the output (φ1 or φ2) to which it is connected is transitioning to a 1. For each of φ1 and φ2, this can occur only during alternate 2x VCO cycles, 2x VCO cycles during which the respective outputs φ1 and φ2 transition to a 1 alternating with each other. For each of φ1 and φ2, it is during such alternate cycles of the 2x VCO signal 31a that a respective one of the feedback loops L1 and L2 needs to be, and is, inhibited (by turning off switching transistor Q3 or Q4), but only while 2x VCO is high.

Thus, it may be stated that each of the gating transistors Q3 and Q6 is operative to prevent a signal at one of the outputs, φ1 or φ2, from being fed back to a respective one of the inputs, SET or RST, during a predetermined fraction (while 2x VCO is high) of every other cycle of the 2x VCO signal. Further, it may be said that the cycles during which one of the switching transistors prevents such signal feedback in one of the feedback loops L1 and L2 alternate with the cycles during which the other switching transistor similarly inhibits the other feedback loop.

Also provided, by way of an enhanced version 32C of the window generator 32, are means for initially setting the window generator 32 of FIG. 6 into a known state, in the preferred embodiment, the RESET state, regardless of the normally alternating logic level of the 2x VCO input signal. Illustrated in FIG. 8, the enhanced window generator 32C comprises the window generator 32 of FIG. 6, enhanced by the addition of n-channel transistors Q8 and Q10, p-channel transistors Q7 and Q9, an inverter I5, and a NAND gate N5. From the prior discussion, the window generator 32 (or 32C) will be put into a RESET state when the $\overline{RST}$ and e,ovs/-SET/ signals are 0 and 1 respectively. For $\overline{RST}$ to be a 0, both inputs to NAND gate N4 must be 1's. The enhanced window generator 32C is controlled by a $\overline{RESET}$ input signal in addition to the 2x VCO signal 31a. The 2x VCO signal 31a is applied to one input of the NAND gate N5 and, through it, is gated to the node P0 to which it had been directly applied in the FIG. 6 circuit. The $\overline{RESET}$ signal is applied to the other input of N5, consisting of the input node P3 of the enhanced window generator 32C. NAND gate N5 provides an internal clock signal, ICLK, which is identical to 2x VCO signal 31a if its $\overline{RESET}$ input is held high, and is a constant 1 if its $\overline{RESET}$ input is held low, without regard to the 2x VCO 31a signal level. Thus, one of the necessary conditions for enhanced window generator 32C to be put in a RESET state—that both inputs to NAND gate N4 be 1's—is met. Pull-up transistor Q9 is provided, between node P2 and VDD, to pull node P2 to the VDD potential when it is turned on by $\overline{RESET}$ applying a 0 to its gate.

Figure 8:
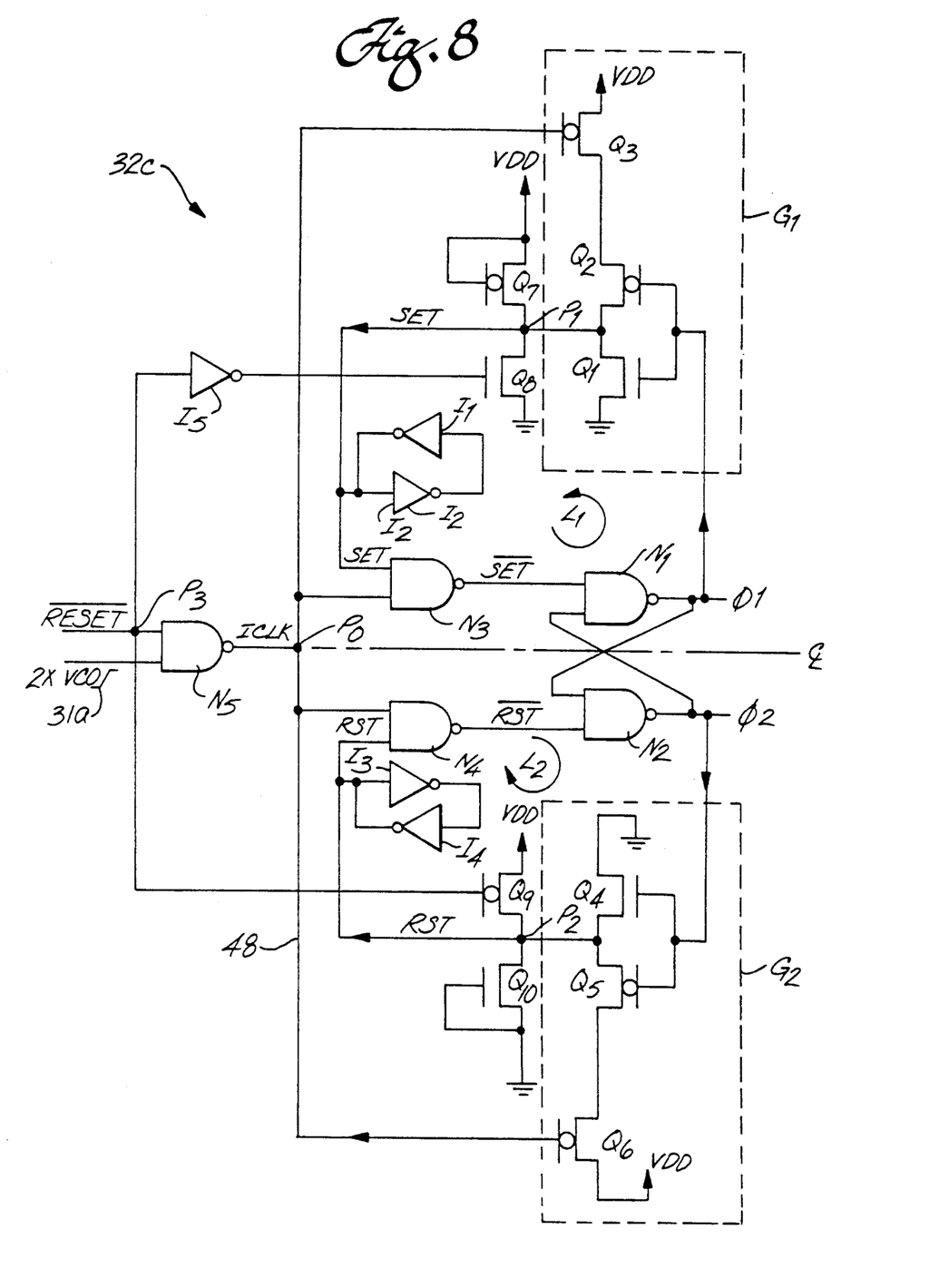
FIG. 8 is a circuit diagram of a divide-by-two circuit similar to that illustrated in FIG. 6, but with certain enhancements added to permit initially setting the circuit of FIG. 6 into a known state.

As previously noted, in order for the enhanced window generator 32C to be in a RESET state, it is a second necessary condition that $\overline{SET}$ be a 1. This condition is met by having any input to NAND gate N3 be a 0. Since ICLK is being held high by application of a 0 $\overline{RESET}$ signal to node P3, the pull-down transistor Q8 is provided, between node P1 and ground, to pull node P1 to the ground potential when it is turned on. Since a 1 is required to turn transistor Q8 on, an inverter, I5, is provided between node P3 and the gate of Q8, to invert the $\overline{RESET}$ 0 on signal level on node P3 to a required 1, turning Q8 on and thus providing a 0 signal at the SET input of NAND gate N3.

Without more, transistors Q8 and Q9 would violate the symmetry of the enhanced window generator 32C, since they are of opposite conductivity types, and therefore present different parasitic characteristics to their respective circuit halves Dummy transistors Q7 and Q10 are provided to retain circuit symmetry. Dummy transistor Q7, configured as a reverse diode, is source-drain connected between node P1 and VDD, while dummy transistor Q10, likewise reverse diode configured, is source-drain connected respectively between node P2 and ground. Q7 and Q10 are identical in design to Q9 and Q8. Circuit symmetry is thus retained about the centerline CL. Since the inverter I5 is not in any portion of a signal path associated with the normal operation of the window generator, its impact on symmetry is immaterial.

A singular feature of the present invention is its particular utility in a variable frequency data recording and recovery technique, such as that used in Zoned Recording (ZR). Variable frequency data recovery is characterized by a variable channel rate, which depends on the data recording frequency chosen for the particular data track being read. That variable channel rates present a problem to prior art data recovery systems will be understood when it is recalled that prior art systems (such as that described with reference to FIG. 3) typically rely on inverter elements (21) to derive a data detection window clock (20) from the phase reference window clock (13). The delay introduced by an inverter is typically fixed, and invariant with respect to frequency. As the channel frequency varies, the VCO output signal necessarily varies, and its period is shortened with increasing channel rate. This VCO period shortening is directly reflected in the period of the data detection window clock 20. A fixed delay added to a shortened data detection window clock can give rise to a large percent error in window position with respect to that of a data pulse. For instance, a 50-nanosecond window, delayed 10 nanoseconds by an inverter, will experience a 20% position error. A 40-nanosecond window, shortened from 50 nanoseconds by an increased channel rate, will experience a 25% position error, if delayed the same 10 nanoseconds by the inverter. It must be remembered that the fixed delay imposed by the inverter 21 is introduced with respect to the phase detection window clock 13, which is locked in phase with the delayed data 12. The phase relationship between such a phase detection window clock 13 and data detection window clock 20 is therefore seen to be frequency-variant.

The window generator of the present invention provides two synchronous clock signals whose period may vary directly with a variable channel rate, and whose phase relationship is, as a result, invariant with frequency. Since both clock signals are derived from a common input clock, rather than being derived one from the other, neither clock signal encounters a fixed, frequency-invariable delay element. A variable channel rate will affect only the width of the data detection window W, not its phase location relative to the phase detection window clock or a delayed data pulse. The present invention will thus be particularly useful for providing low error-rate centering of jittered data in a variable width data detection window such as would be used in a variable frequency data recording and recovery technique.

It will be apparent to those skilled in the art that the invention brings to the field of disk drive data recovery systems a novel method and circuit for synchronizing an internally generated data detection window clock signal to an irregular stream of delayed data pulses, recovered from a disk drive during a read operation, and subject to random position displacement due to the effects of bit jitter Such synchronizing circuitry incorporates a phase-locked loop and digital logic circuitry for phase and data detection, and subsequent shifting of the synchronized data signal out of the data synchronizer. Features of the present invention may be embodied physically in a wide variety of ways and with different components and elements. For instance, the VCO may be implemented as a multivibrator or variable-relaxation rate oscillator. Multiple divide-by-two circuits may be provided, and driven by a common VCO input signal, for provision of clock signals, synchronous with the PLL clock signals, thereby reducing the load on any one such circuit. Having thus described an embodiment of the invention, it will now be appreciated that the objects of the invention have been fully achieved and that differing embodiments and applications of the invention will suggest themselves without departure from the spirit and scope of the invention.

What is claimed is:

1. A method for deriving from an irregular series of data pulses in a pulse train, signals designating successive consecutive time periods, each signal dedicated to the discerning of the presence or absence of a respective one of said data pulses during a respective one of said time periods comprising the steps of:
   (a) generating an input clock signal at a frequency which is approximately an integral multiple of at least two times the frequency of said pulse train;
   (b) applying said input clock signal to a symmetric window generator having a pair of outputs on which first and second output clock signals appear exactly 180° out-of-phase with each other in response to said input clock signal;
   (c) placing said input clock signal generating means and said window generator in a phase-locked loop wherein said first clock output and said pulse train are phase-compared, and the frequency of said input clock signal is varied until the phases of said first clock output and said pulse train match; and
   (d) using the second clock output to designate said successive time periods.

2. A disk drive data synchronizer for deriving from an irregular series of data impulses in a pulse train, window clock signals designating successive time periods, each window clock signal being dedicated to the discerning of the presence or absence of a respective one of said data pulses during a respective one of said time periods and to the synchronization of a discerned one of said data pulses, comprising:
   (a) variable-frequency means for generating a first periodic clock signal whose nominal frequency is an integral multiple of at least two times the frequency of said pulse train and whose frequency is variable in response to a frequency-control signal;
   (b) a symmetric window generator driven by said first periodic clock signal for generating second and third periodic clock signals in response to and at an integral submultiple of the frequency of said first clock signal, said second and third clock signals being phased exactly 180° apart from each other;
   (c) phase detector means for producing a phase detector signal representative of the sign and magnitude of the phase difference between said second clock signal and said data pulses, and means for applying the average of said phase detector signal to said variable-frequency means as its frequency-control signal; and
   (d) data detector means responsive to said third clock signal and to said data pulses for discerning the presence or absence of a data pulse during each of said time periods and synchronizing said discerned data pulse with respect to said third clock signal.

3. The disk drive data synchronizer of claim 2, wherein:
   (a) said window generator has substantially identical halves about a line of symmetry; and
   (b) one-half of said symmetric window generator forms part of a phase-locked loop which also includes said variable frequency means and said phase detector means.

4. The disk drive data synchronizer of claim 2, wherein said window generator comprises an integrated circuit having a line of symmetry separating substantially identical halves of said integrated circuit, each half having an output on which is carried a respective one of said second and third clock signals.

5. The disk drive data synchronizer of claim 3, wherein each half of said window generator comprises a respective one of a pair of cross-connected logic gates and a feedback loop connected between the output of said cross-connected logic gate and its input.

6. The disk drive data synchronizer of claim 5, wherein said integrated circuit is a frequency divider having first and second mutually-exclusive states, and wherein each said feedback loop includes means for conditionally enabling it during portions of the times during which respective ones of said states prevail.

7. The disk drive data synchronizer of claim 5, wherein said first periodic clock signal is symmetric and is twice the frequency of said pulse train, said window generator is switched between opposite states upon the occurrence of successive like edges of said first periodic clock signal, a first series of alternate like clock signal edges setting said window generator, a second series of alternate like clock signal edges alternating with said first series resetting said window generator, each half of said window generator imposing an identical time delay between said ones of said first and second series of like clock signal edges and corresponding setting and resetting of said window generator.

8. The disk drive data synchronizer of claim 2, wherein said first periodic clock signal is symmetric, and wherein said symmetric window generator comprises:

(a) a symmetrically integrated circuit having a line of symmetry separating substantially identical first and second halves, each half comprising first and second series-connected NAND gates and a conditionally-enabled feedback loop connecting the output of the second NAND gate to the input of the first NAND gate;

(b) means for cross-connecting the output of each said second NAND gate in a given half of said window generator to the input of the first NAND gate in the other half of said window generator;

(c) means for applying said first symmetric periodic input clock signal to said first NAND gates so as to cause said window generator to change at regular intervals between opposite states in response to successive like edges of said clock signal; and (d) means for alternately enabling said feedback loops during mutually-exclusive periods which are shorter than the period of said input clock signal.

9. The disk drive data synchronizer of claim 8, wherein the periods during which a given feedback loop is enabled represents a fraction of the time during which said window generator is in a given one of its states.

10. The disk drive data synchronizer of claim 9, wherein the periods during which a given feedback loop is enabled are of shorter duration than the time elapsed between the occurrence of a given edge of the input clock signal and the change of state of said window generator in response to said given edge.

11. The disk drive data synchronizer of claim 7, wherein each half of said window generator includes first and second NAND gates, the output of the first NAND gate of each half being connected to an input of the second NAND gate of the same half and the output of the second NAND gate of each half being cross-connected to the input of the second NAND gate of the other half and operatively connected through said feedback loop to the input of the first NAND gate of the same half.

12. The disk drive data synchronizer of claim 2, wherein said symmetric window generator comprises first and second inputs, each receiving said first periodic clock signal, first and second outputs, first and second feedback means for connecting each of said first and second outputs to a respective one of said first and second inputs so that said window generator changes between opposite states in response to successive like edges of said first periodic clock signal, and switch means responsive to said first periodic clock signal for disabling each said feedback means during a portion of every other cycle of said first periodic clock signal.

13. The disk drive data synchronizer of claim 2, wherein elements of said window generator are distributed about an axis of symmetry so that each element that is in the signal path associated with the normal operation of the window generator on one side of said axis is matched by a corresponding substantially-identical element on the other side of said axis.

14. The disk drive data synchronizer window generator of claim 13, wherein each side of said window generator includes:

(a) a first logic gate and a second logic gate having an output connected to the input of said first logic gate; and (b) a respective one of said first and second feedback means, connected between said first and second logic gates.

15. The disk drive data synchronizer of claim 2, wherein a phase relationship of the second and third clock signals is frequency invariant.

* * * * *